(12) United States Patent
Carmona

(10) Patent No.: US 12,018,844 B1
(45) Date of Patent: Jun. 25, 2024

(54) OVEN RACK

(71) Applicant: Michael B. Carmona, Agoura Hills, CA (US)

(72) Inventor: Michael B. Carmona, Agoura Hills, CA (US)

(*) Notice: Subject to any disclaimer, the term of this patent is extended or adjusted under 35 U.S.C. 154(b) by 0 days.

(21) Appl. No.: 18/613,010

(22) Filed: Mar. 21, 2024

Related U.S. Application Data

(60) Provisional application No. 63/457,930, filed on Apr. 7, 2023.

(51) Int. Cl.
   *F24C 15/16*   (2006.01)
   *A21B 3/07*    (2006.01)
   *A21B 3/18*    (2006.01)

(52) U.S. Cl.
   CPC ............. *F24C 15/162* (2013.01); *A21B 3/07* (2013.01); *A21B 3/18* (2013.01)

(58) Field of Classification Search
   CPC ............ F24C 15/162; A21B 3/07; A21B 3/18
   See application file for complete search history.

(56) References Cited

U.S. PATENT DOCUMENTS

| 2,987,363 | A | * | 6/1961 | Morse | F24C 15/162 |
| | | | | | 312/274 |
| 3,016,276 | A | * | 1/1962 | Morse | F24C 15/162 |
| | | | | | 312/274 |
| 3,636,937 | A | * | 1/1972 | Detterbeck | F24C 15/162 |
| | | | | | 126/340 |
| 2005/0217658 | A1 | * | 10/2005 | Sozo | F24C 15/162 |
| | | | | | 126/19 R |
| 2021/0161151 | A1 | * | 6/2021 | Thorogood | H05K 7/20145 |

* cited by examiner

*Primary Examiner* — Alfred Basichas
(74) *Attorney, Agent, or Firm* — QuickPatents; Kevin Prince

(57) ABSTRACT

The present invention relates to an oven rack apparatus designed to enhance kitchen safety by facilitating the loading and unloading of cookware. The apparatus includes a heat-resistant rack equipped with rollers to enable easy sliding of cookware. It features adjustable, retractable legs that can be extended to match the height of an oven shelf and retracted for storage. The rack may include raised side members for additional stability and may display marketing materials. The legs can fold under the rack to conserve storage space. The apparatus can maintain a height adjustment for the legs to avoid readjustment with each use and is adjustable to fit most standard ovens. This invention provides a practical solution for safely handling cookware with respect to an oven, with additional features that enhance convenience and adaptability.

10 Claims, 5 Drawing Sheets

OVEN RACK

CROSS REFERENCE TO RELATED APPLICATIONS

This application claims the benefit of U.S. Provisional Patent Application 63/457,930, filed on Apr. 7, 2023, and incorporated herein by reference.

STATEMENT REGARDING FEDERALLY SPONSORED RESEARCH AND DEVELOPMENT

Not Applicable.

FIELD OF THE INVENTION

This invention relates to ovens, and more particularly to an oven rack that facilitates loading and unloading of cooking vessels.

BACKGROUND

The field of kitchen appliances, particularly those related to ovens, has long been focused on improving the safety and convenience of cooking. Traditional methods of handling hot cookware, such as roasting pans, involve the risk of burns and accidents. Typically, users leverage hot, unstable, and heavy pans at arm's length with or without the aid of kitchen tools like long-handled tongs or handles. Alternatively, they may slide the hot pan onto a manually held horizontal cutting board, using one hand to pull the pan and the other to support the board. While these methods have been used for centuries, they are fraught with the potential for kitchen accidents, which are a significant cause of hospital visits, especially during holidays and family events.

Existing solutions include a wrench-like device for grabbing and holding or pulling out the oven rack and aftermarket oven racks with foldable sides to guide the roasting pan as it enters or exits the oven. Despite these innovations, the fundamental issue of safely removing or inserting a hot, heavy, and unstable pan from a hot oven remains a challenge. The current solutions, while functional, do not address the critical step of safely transporting the cookware from the oven to a safe area for handling, which is where most accidents occur.

Given the drawbacks of existing methods and devices, there is a clear need for an invention that minimizes the risk of burns and accidents associated with oven use. An ideal invention would provide a stable, heat-resistant platform with features that facilitate the easy and safe transfer of hot cookware to and from the oven. It would offer an adjustable and secure mechanism that aligns with the oven's existing rack, allowing for a seamless transition of cookware without the need for direct hand contact with the hot items. Additionally, such a device would be easily storable, requiring minimal space when not in use, and would be universally adjustable to fit a wide range of oven sizes.

The invention would also be constructed from durable, lightweight, and heat-resistant materials, making it easy to handle and clean. In essence, the needed invention would add a critical step in the cooking process that has been overlooked: a safe, efficient, and user-friendly means of handling hot cookware, thereby reducing the likelihood of kitchen accidents and burns. The present invention accomplishes these objectives.

SUMMARY OF THE INVENTION

The present device is an apparatus designed to assist with the placement and removal of cookware from an oven. It features a heat-resistant rack with rollers on the top surface to enable cookware to slide easily between the rack and the oven shelf. The apparatus includes adjustable, retractable legs that can be extended to match the height of the oven shelf and retracted for convenient storage and transportation. When the oven door is open, the extended legs allow the rack to rest on the door, aligning the rollers with the shelf for straightforward movement of cookware.

Optionally, the rack may have raised side members to stabilize cookware and guide it during transfer. These side members can also display marketing materials. The rollers may be designed to spin, facilitating the movement of cookware across the rack. The legs can fold under the rack to reduce storage space when not in use.

The apparatus can optionally maintain a height adjustment for the legs to avoid readjustment with each use. It can also be adjusted to fit most standard ovens, allowing for a single configuration. Each leg can be fixed in place with an adjustment mechanism that includes a slot and a locking screw.

The rack may be inclined from back to front for ergonomic benefits when transferring cookware. This invention provides a straightforward solution for handling cookware with respect to an oven, with additional features that can enhance its convenience and adaptability.

The present invention has been developed to address the shortcomings of the prior art by providing a practical and effective solution to the safety issues associated with handling hot cookware. This new apparatus offers a stable, heat-resistant platform that simplifies the transfer of cookware to and from the oven. It features an adjustable mechanism that aligns with the oven's existing rack, allowing for the safe movement of cookware without direct hand contact with hot surfaces. Designed for convenience, the invention is easily stored due to its compact design and is universally adjustable to fit various oven sizes. Constructed from durable, lightweight, and heat-resistant materials, the invention is easy to handle and clean. Ultimately, the present invention fills a critical need in the cooking process by providing a safe, efficient, and straightforward method for handling hot cookware, thereby reducing the risk of kitchen accidents and burns. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
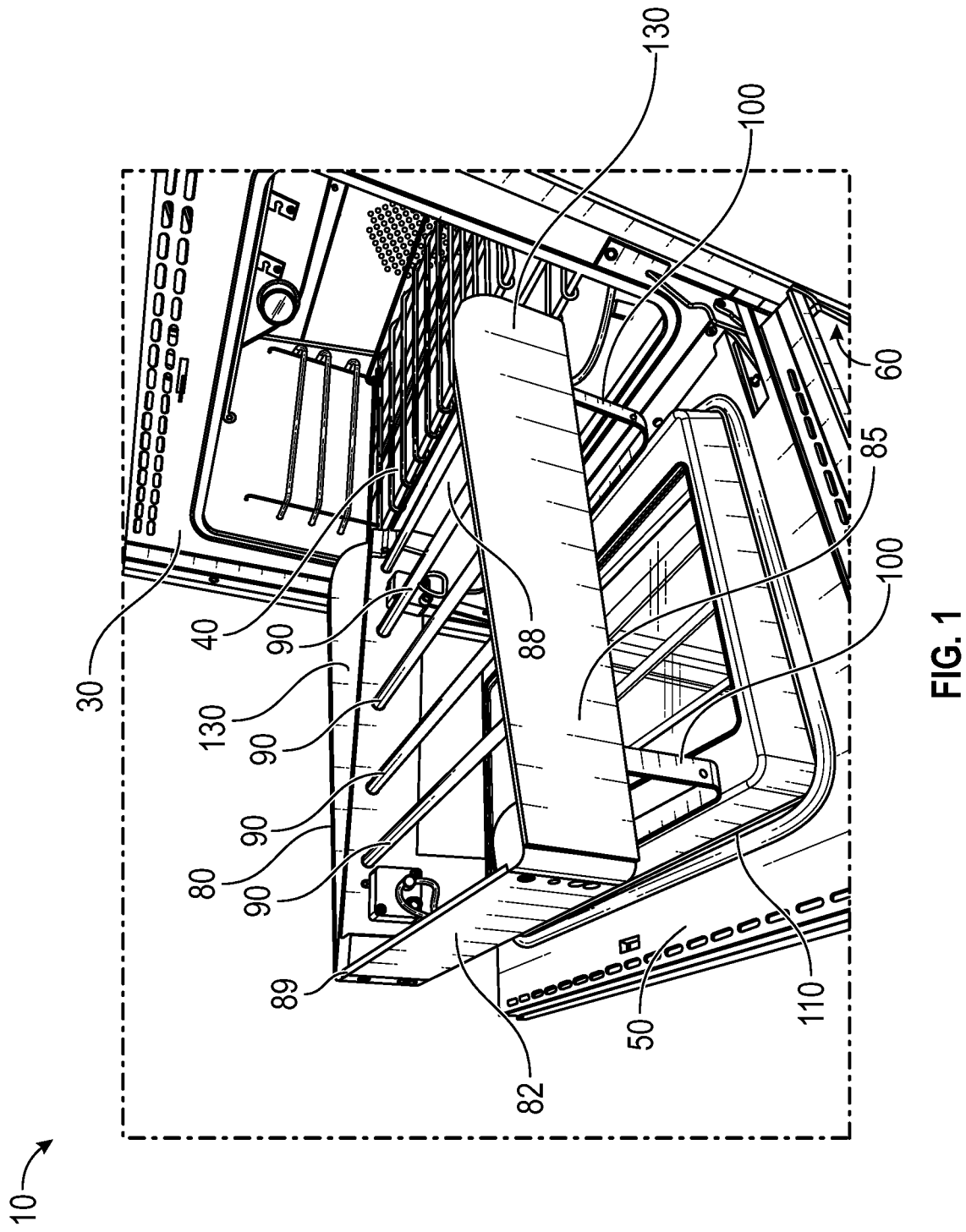
FIG. 1 is a perspective view of the invention, showing a rack supported by an oven door of an oven, legs of the rack in an extended configuration and adjusted to a height for engaging a shelf of the oven.
Figure 2:
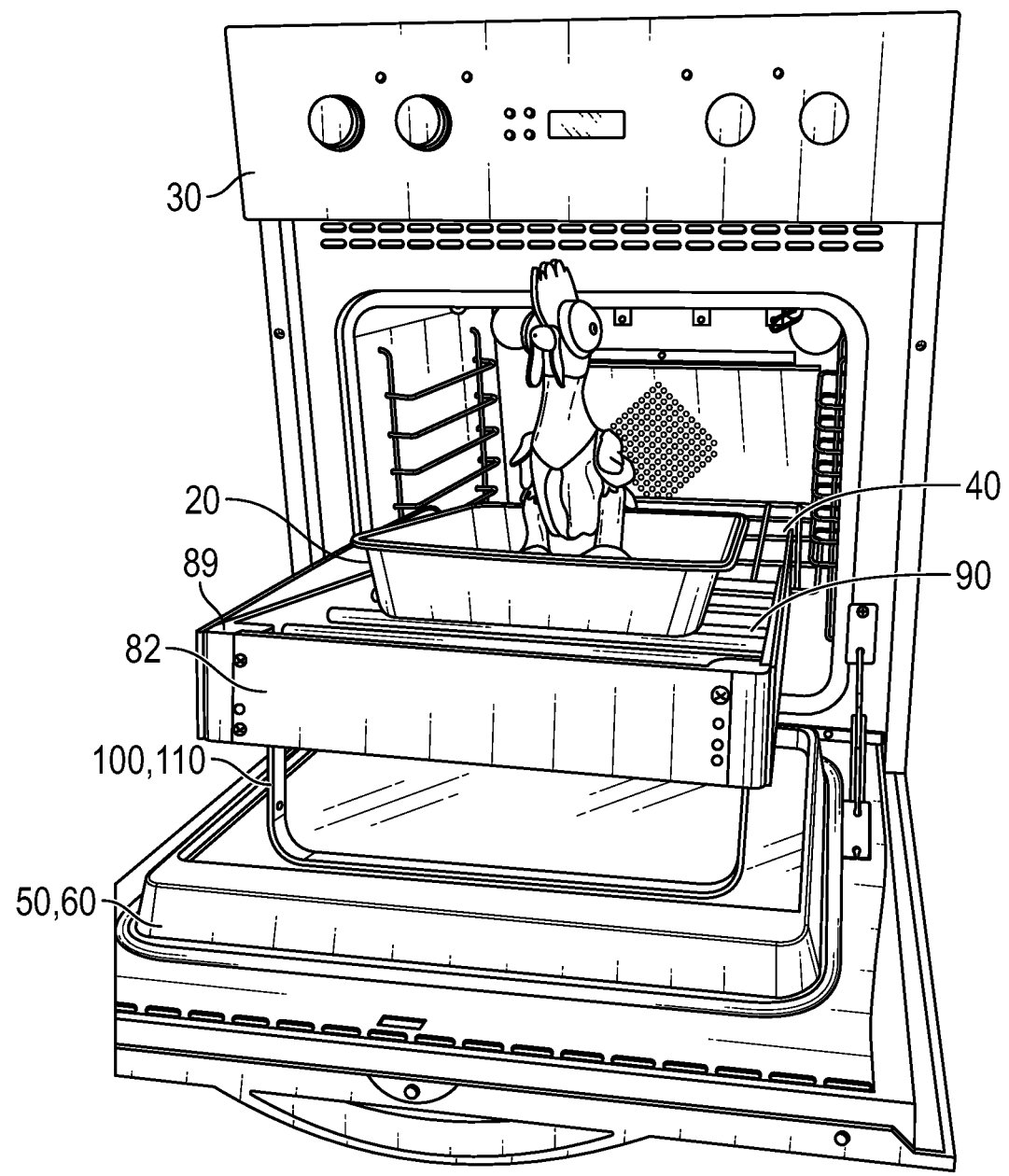
FIG. 2 is a front perspective view of the invention.
Figure 3:
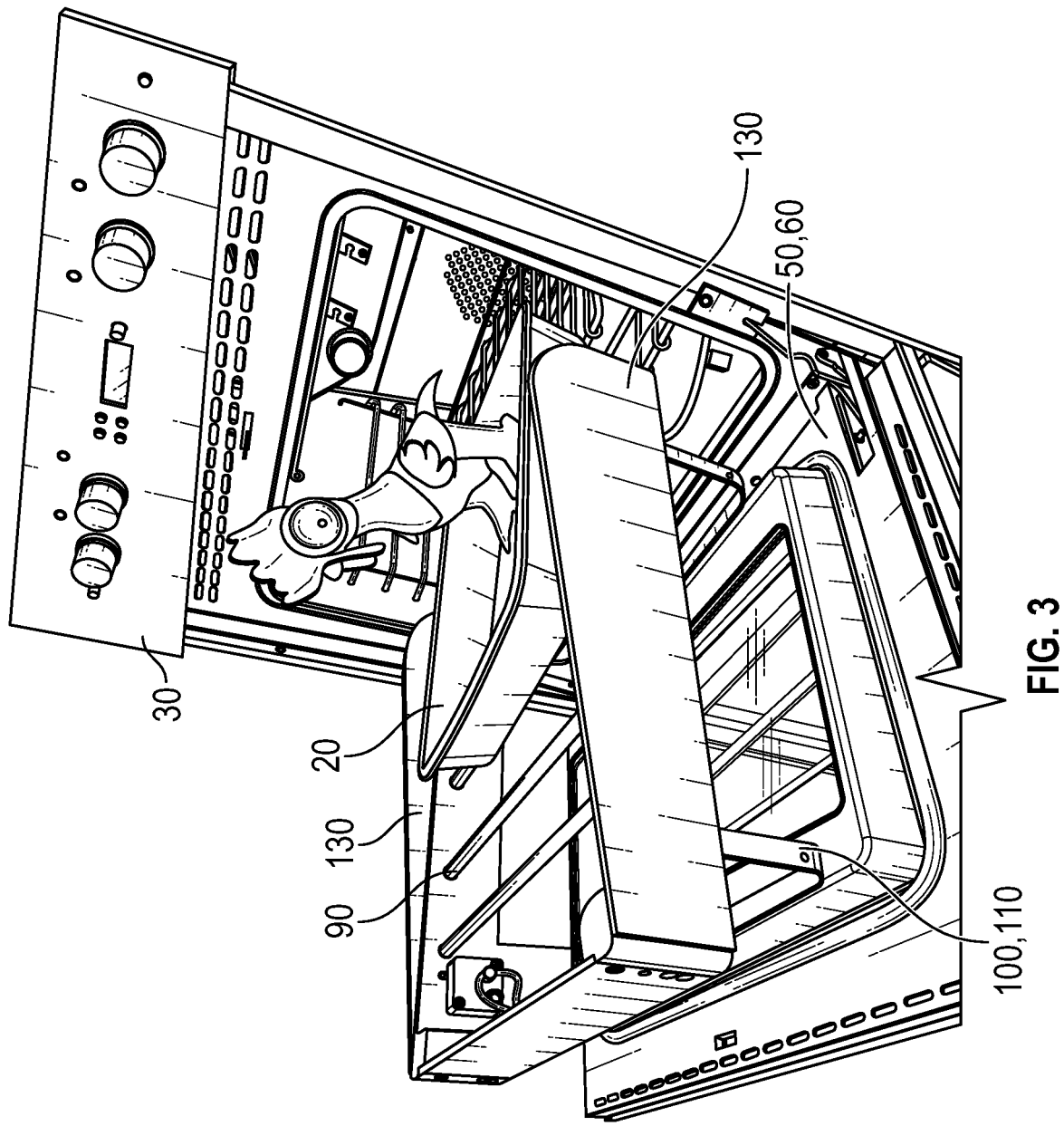
FIG. 3 is a side perspective view showing a transfer of a cookware from the invention into an oven.
Figure 4:
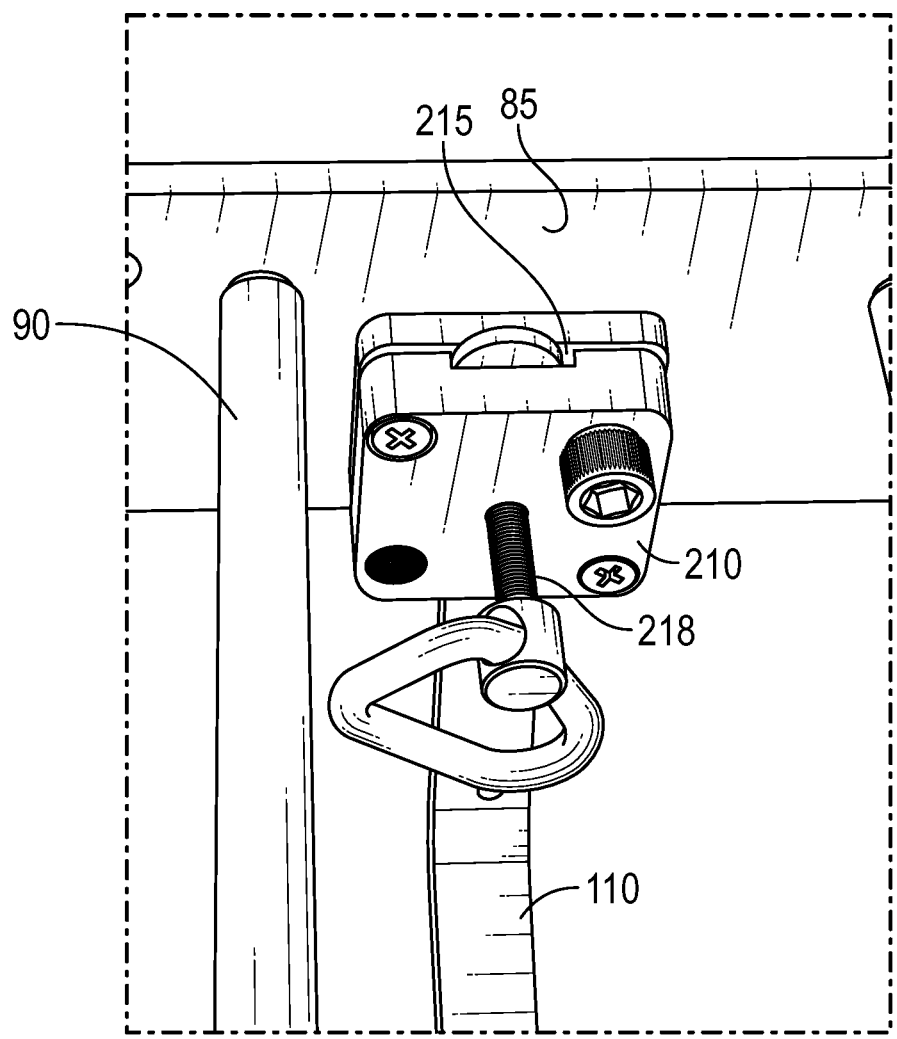
FIG. 4 is an enlarged perspective view of a height adjustment mechanism of one of the legs of the invention.
Figure 5:
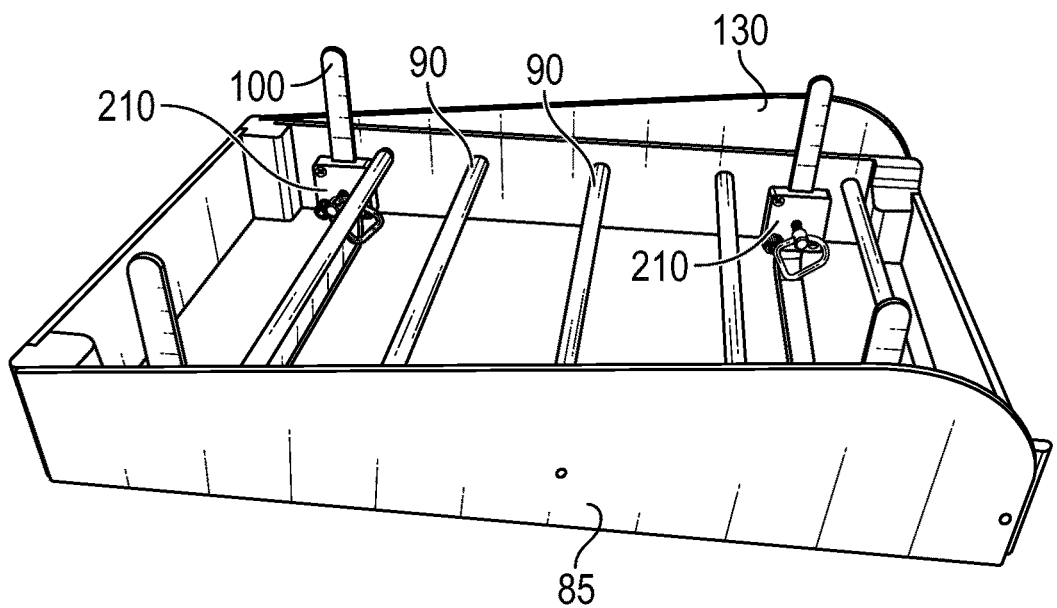
FIG. 5 is a side perspective view of the invention, illustrate the legs in a lowered position.

FIGS. 1-3 illustrate an apparatus 10 designed to support and transfer cookware 20 to and from an oven 30. The oven 30 is of the type equipped with at least one shelf 40, and an oven door 50 that is capable of moving between an open position 60 and a closed position (not shown). The apparatus 10 includes a heat-resistant rack 80 that is structured with a front end 82 and a rear end 88. The rear end 88 of the rack 80 is specifically configured to align with the oven shelf 40. The rack 80 also features two lateral sides 85 and a plurality of rollers 90 located on a top side 89 of the rack 80. These rollers 90 are designed to facilitate the smooth sliding movement of cookware 20 between the rack 80 and the shelf 40.

Figure 6:
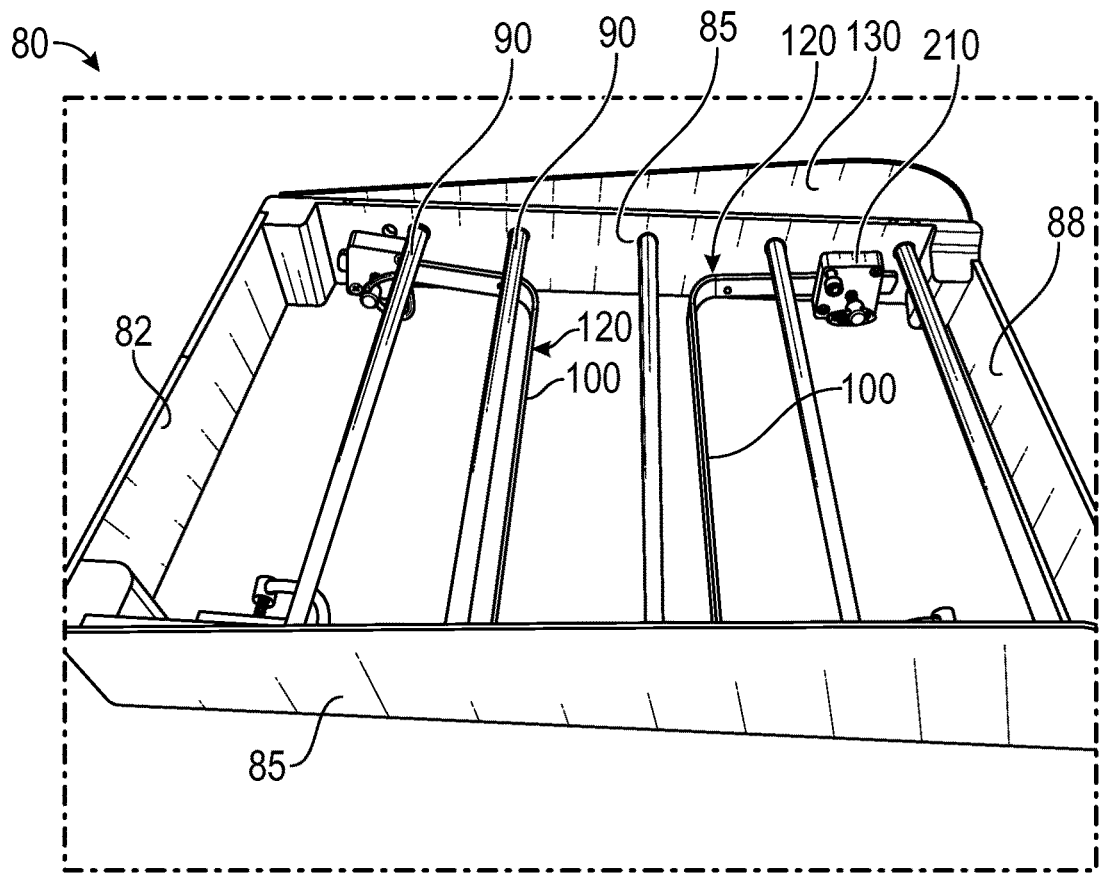
FIG. 6 is a side perspective view of the invention, illustrating the legs in a retracted configuration.

The apparatus 10 further comprises a set of adjustable, retractable legs 100. These legs 100 are connected to the rack 80 and are capable of height adjustment. This feature allows the rack 80 to align with the oven shelf 40 when the legs 100 are in an extended configuration 110. For storage and transport purposes, the legs 100 can be retracted into a retracted configuration 120 (FIG. 6). When the oven door 50 is in the open position 60, the legs 100 can be extended into the extended configuration 110 to rest on the oven door 50 (FIGS. 1 and 2), thereby aligning the rollers 90 with the oven shelf 40 and facilitating the transfer of cookware 20 into and out of the oven 30.

In an optional embodiment of the invention, the heat-resistant rack 80 may further include raised side members 130 on both lateral sides. These raised side members 130 provide additional stability for the cookware 20 and assist in guiding the cookware 20 during the transfer into or out of the oven 30. Each raised side member 130 further provides for marketing indicia (not shown) on the raised side members 130. This area can be utilized to display branding, instructions, or other relevant information.

Preferably, the rollers 90 may be secured against the sides of the rack 80 and are designed to spin, which facilitates the movement of the cookware 20 as it is rolled over them. In a further optional configuration, the adjustable, retractable legs 100 are attached to both sides at the underside of the rack 80. These legs 100 are designed to fold underneath the rack 80 (FIG. 6), which minimizes the storage space required when the apparatus 10 is not in use.

The heat-resistant rack 80 may also be optionally constructed from materials such as aluminum or other lightweight heat-resistant materials, providing durability and ease of handling and cleaning. Optionally, the legs 100, once adjusted to align with a specific oven shelf height, are capable of retaining this height adjustment for subsequent uses, eliminating the need for further adjustment. In another optional aspect, the apparatus 10 is designed to be universally adjustable to fit most standard ovens 30, which allows for a one-time configuration without the need for additional adjustments.

For example, each leg 100 may be optionally fixed with one of the lateral sides 85 of the rack 80 at an adjustment mechanism 210 (FIG. 3), which includes a slot 215 through which the leg 100 traverses, and a locking screw 218 that, when tightened, presses against the leg 100 to fix it within the slot 215. The entire adjustment mechanism 210 is preferably designed to be selectively rotatable between the extended configuration 110 and the retracted configuration 120.

Optionally, the top side of the rack 80 may be inclined from the rear end 88 to the front end 82 when the legs 100 are equally adjusted, providing a slight gravity-assist during the transfer of cookware 20 into the oven 30.

In addition to the aforementioned features, the apparatus 10 may further include a unique set of heat-absorbing components that enhance the safety and functionality of the device when in use. These components may consist of specialized materials integrated into the rack 80 and legs 100, designed to absorb and dissipate heat more effectively, reducing the risk of burns during the handling of hot cookware 20. The inclusion of these heat-absorbing elements is particularly beneficial during high-temperature cooking and baking processes, providing an extra layer of protection to the user.

Moreover, the apparatus 10 can be equipped with a locking mechanism (not shown) that securely attaches the adjustable, retractable legs 100 to the oven 30, ensuring that the rack 80 remains stable during the loading and unloading of heavy cookware 20. This locking mechanism can be a simple yet robust design, such as a clasp or latch, a magnetic fastener, or the like that can be easily engaged or disengaged by the user.

The detailed design of the rollers 90 may also be refined to include a non-stick surface or coating, which further eases the movement of cookware 20 and simplify cleaning after use. This non-stick feature prevents food and other baking residues from adhering to the rollers 90, maintaining the apparatus 10 in pristine condition over multiple uses.

Lastly, the apparatus 10 can offer modularity in its design, allowing users to add or remove components such as the raised side members 130 or additional panels for supporting cookware 20, depending on their specific needs. This modularity makes the apparatus 10 adaptable to a wide range of cooking tasks and oven sizes, enhancing its appeal to a broader user base.

While a particular form of the invention has been illustrated and described, it will be apparent that various modifications can be made without departing from the spirit and scope of the invention. For example, the rollers 90 may be fixed to a front side (not shown) with spacers (not shown), or the like. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms.

Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An apparatus for supporting and transferring cookware to and from an oven having at least one adjustable shelf and an oven door movable between an open position and a closed position, comprising:
    a heat-resistant rack having a front end, a rear end configured for alignment with the oven shelf, two lateral sides, and a plurality of rollers disposed on a top side thereof, the rollers configured to facilitate a sliding movement of the cookware between the rack and the shelf;
    a set of adjustable, retractable legs connected to the rack, the legs being capable of height adjustment to align the rack with the oven shelf in an extended configuration, and retractable into a retracted configuration for storage and transport;
    whereby with the oven door in the open position, the legs are extended into the extended configuration to rest on the oven door to align the rollers with the oven shelf, facilitating the transfer of the cookware into and out of the oven.

2. The apparatus of claim 1, wherein the heat-resistant rack further comprises raised side members on both lateral sides to provide additional stability for the cookware and to assist in guiding the cookware during the transfer into or out of the oven.

3. The apparatus of claim 2, wherein the raised side members each provide an area for marketing indicia.

4. The apparatus of claim 2, wherein the top side of the rack is inclined from the rear end to the front end when the legs are equally adjusted.

5. The apparatus of claim 1, wherein the rollers are secured against the sides of the rack and are designed to spin as the cookware is rolled over them.

6. The apparatus of claim 1, wherein the adjustable, retractable legs are attached to both sides at an underside of the rack and are designed to fold underneath the rack to minimize storage space required when the apparatus is not in use.

7. The apparatus of claim 1, wherein the heat-resistant rack is constructed from materials selected from the group consisting of aluminum and/or other lightweight heat-resistant materials.

8. The apparatus of claim 1, wherein the legs, once adjusted to a specific oven shelf height, are capable of retaining the height adjustment for subsequent uses without requiring further adjustment.

9. The apparatus of claim 1, wherein each leg is fixed with one of the lateral sides of the rack at an adjustment mechanism that includes a slot through which the leg traverses, and a locking screw that, when tightened, presses against the leg to fix the leg within the slot.

10. An apparatus for supporting and transferring cookware to and from an oven having at least one adjustable shelf and an oven door movable between an open position and a closed position, the apparatus comprising:
    a heat-resistant rack having a front end, a rear end configured for alignment with the oven shelf, two lateral sides, and a plurality of rollers disposed on a top side thereof, the rollers configured to facilitate a sliding movement of the cookware between the rack and the shelf;
    raised side members on both lateral sides of the rack to provide additional stability for the cookware and to assist in guiding the cookware during the transfer into or out of the oven, wherein the raised side members each provide an area for marketing indicia; and
    a set of adjustable, retractable legs connected to the rack, the legs being capable of height adjustment to align the rack with the oven shelf in an extended configuration, and retractable into a retracted configuration for storage and transport, wherein the legs are attached to both sides at an underside of the rack and are designed to fold underneath the rack to minimize storage space required when the apparatus is not in use;
    an adjustment mechanism for each leg that includes a slot through which the leg traverses, and a locking screw that, when tightened, presses against the leg to fix the leg within the slot, allowing the legs, once adjusted to a specific oven shelf height, to retain the height adjustment for subsequent uses without requiring further adjustment;

whereby with the oven door in the open position, the legs are extended into the extended configuration to rest on the oven door to align the rollers with the oven shelf, facilitating the transfer of the cookware into and out of the oven;

wherein the heat-resistant rack is constructed from materials selected from the group consisting of aluminum and/or other lightweight heat-resistant materials, and the rollers are secured against the sides of the rack and are designed to spin as the cookware is rolled over them; and wherein the top side of the rack is inclined from the rear end to the front end when the legs are equally adjusted, and the apparatus is designed to be universally adjustable to fit most standard ovens without the need for further adjustments once initially configured.

\* \* \* \* \*